United States Patent
Akiyama

[11] Patent Number: 5,245,270
[45] Date of Patent: Sep. 14, 1993

[54] ENERGY STORAGE SYSTEM

[75] Inventor: Nobuyuki Akiyama, Tokyo, Japan

[73] Assignee: Hiroomi Ichinose, Shimoinayoshi, Japan

[21] Appl. No.: 727,269

[22] Filed: Jul. 8, 1991

[30] Foreign Application Priority Data

| Jul. 8, 1990 | [JP] | Japan | 2-180299 |
| Aug. 27, 1990 | [JP] | Japan | 2-224585 |
| Nov. 28, 1990 | [JP] | Japan | 2-328149 |

[51] Int. Cl.⁵ .............................................. H02K 7/02
[52] U.S. Cl. .................................... 322/4; 310/52; 505/878
[58] Field of Search ............... 322/2 R, 4; 290/54; 310/40 R, 74, 52, 54; 505/1, 876, 877, 878

[56] References Cited

U.S. PATENT DOCUMENTS

| 3,970,917 | 7/1976 | Diggs | 322/4 |
| 4,182,967 | 1/1980 | Jordan | 310/74 |
| 4,612,494 | 9/1986 | Kawamura | 322/4 |
| 4,725,766 | 2/1988 | Pinson | 322/4 |
| 4,920,095 | 4/1990 | Ishigaki et al. | 322/4 X |
| 5,065,060 | 11/1991 | Takahashi et al. | 310/74 |

Primary Examiner—Kristine L. Peckman
Attorney, Agent, or Firm—Jordan and Hamburg

[57] ABSTRACT

A rotary member is continually held suspended by a strong pinning force of oxide superconductors in a superconductive state. The magnetic field of magnets on the suspended rotary member is distributed concentrically about the center of the pinning force, so that the rotary member can be continually rotated in a non-contacting state while being lifted off the high temperature oxide superconductors. The rotary member is rotated in a high vacuum and is held to continually rotate for an extended period of time. Kinetic energy is stored in and recovered from the rotating member via an input/output device.

11 Claims, 5 Drawing Sheets

5,245,270

ENERGY STORAGE SYSTEM

FIELD OF THE INVENTION

The present invention relates to an energy storage system which preserves and stores excess energy generated during the night at a power station in the form of kinetic energy of rotation to thereby enable utilization of the energy whenever necessary by taking out the kinetic energy of rotation and converting it into other forms of energy.

BACKGROUND OF THE INVENTION

Demand for electric power generated at power stations is subject to fluctuation depending on the season, the time of day and night, and various means and methods are employed to cope with the changing demand such as by frequently changing and adjusting the amount of power generation according to the demand. As one example of adjusting the amount of power generation, water discharged from a dam during the day is pumped up again using the excess electricity at night to thereby convert the electric energy into potential energy of the water, which is to be utilized once again in power generation. This system is known as pumped storage power generation.

Efficiency in energy conversion in pumped storage power generation is not always high if energy loss during pumping of the water is considered. The system is also defective in that siting of the power station is quite limited.

An attempt has been made to store and utilize the excess electric energy by, for instance, causing a flywheel supported by bearings to continuously rotate with the excess electric energy for an extended period of time.

Since friction of the flywheel must be eliminated with gas to improve the energy efficiency, load of the flywheel acts on the shaft and bearings that are provided beneath the wheel at the center of the rotation to cause frictional force of a great magnitude even if the wheel is rotated under highly reduced pressure. This inevitably causes loss of energy, and it is practically impossible to keep the wheel rotating efficiently for long. When the entire load is designed to be supported by the shaft and bearings provided at the bottom of the wheel, it becomes difficult to make the wheel large and heavy because of the strength of the materials of these component parts.

Further, since the flywheel is supported by the shaft and bearings while being in contact therewith, extraordinary vibrations due to an earthquake and the like would put the flywheel off balance or cause uneven rotation thereof. This would damage the bearings and cause the flywheel to be displaced from the predetermined position of rotation, leading to a potentially disastrous accident.

SUMMARY OF THE INVENTION

The present invention is contrived in view of the defects in the prior art, and aims at providing an energy storage system wherein a rotary member constituting a flywheel which is held suspended in space unsupported is caused to rotate continually by external energy, to thereby store the external energy in the form of kinetic energy of rotation for an extended period of time, and which is characterized in that the system is less restricted in terms of weight and can be easily made large in size and capacity.

The energy storage system comprises an insulated container in which high temperature oxide superconductors are housed in arrangement, a cooling device which cools liquid nitrogen or a coolant for maintaining said insulated container at a temperature below the critical temperature of said high temperature oxide superconductors, a rotary member having a ring or disk like permanent magnet or electromagnet with concentrically distributed lines of magnetic force and a weight attached to the magnet for enhancing the inertia of the rotary member, a vacuum tank which houses at least said insulated container, and the rotary member in a freely rotatable manner and which is maintained at a vacuum by a depressurizing device, and an input/output device which causes the rotary member in the vacuum tank to rotate continually with an external energy for storing the external energy in the form of kinetic energy of rotation and which takes out the rotational energy of the rotary member.

In the energy storage system the magnet which is concentrically provided on the rotary member opposing the high temperature oxide superconductor in the insulated container is divided into sections in the radial direction of the rotary member to increase the magnetic gradient of the magnetic field formed by the magnet.

The energy storage system has high temperature oxide superconductors contained in the insulated container are concentric with each other with varying radii and are arranged in between multilayers of concentric magnets with varying radii.

The energy storage system has a liquid level regulating device is provided to maintain the depth of liquid nitrogen indide the insulated container at a constant predetermined level so that the high temperature oxide superconductors inside the container are submerged in the liquid nitrogen.

The energy storage system has an electric motor with a clutch mechanism interposed between the motor and the rotary member is used as the input unit of the input/output device for rotating the rotary member with external energy.

The energy storage system has a power generator means with a clutch mechanism interposed between the rotary member and the generator means is used as the output unit of the input/output device.

In the energy storage system according to the present invention, the rotary member is held suspended in the vacuum tank by the strong pinning force (fishing effect) of the high temperature oxide superconductors. The superconductors thus pinned by the magnets and the lines of magnetic force from the magnets which penetrate therethrough are distributed concentrically. When the rotary member is rotated about its center, there will be no change in the magnetic field with respect to the superconductors, and the rotary member can be freely rotated about its center while being suspended in the vacuum tank. As a result, once external energy acts on the rotary member via the input/output means to cause the rotary member to rotate, the rotary member will keep rotating continually for an extended period of time in non-contact state; in other words, the external energy can be efficiently stored in the form of kinetic energy of rotation by the rotary member. By taking out the kinetic energy of rotation by the input/output device whenever necessary, the stored energy can be utilized at will.

In the energy storage system according to the another embodiment of the present invention, a magnet attached to the rotary member is divided into sections to increase the magnetic gradient of the magnetic field formed by the magnet. Here, the pinning force (lifting force) (F) of the high temperature oxide superconductor can be expressed by the following equation:

$$F = M \cdot dH/dZ$$

wherein $M = A \cdot Jc \cdot r$

A: proportional constant

Jc: critical current density of the superconductor r: radius of shielding current flowing in the superconductors dH/dZ: magnetic gradient indicating that the pinning force (lifting force) is proportional to the magnetic gradient. Therefore, as the magnetic gradient becomes steep, the pinning force or the lifting force shows a marked increase.

In order that the invention may be more clearly understood, it will now be disclosed in greater detail with reference to the accompanying drawings, wherein:

PREFERRED DESCRIPTION OF THE EMBODIMENTS

Figure 1:
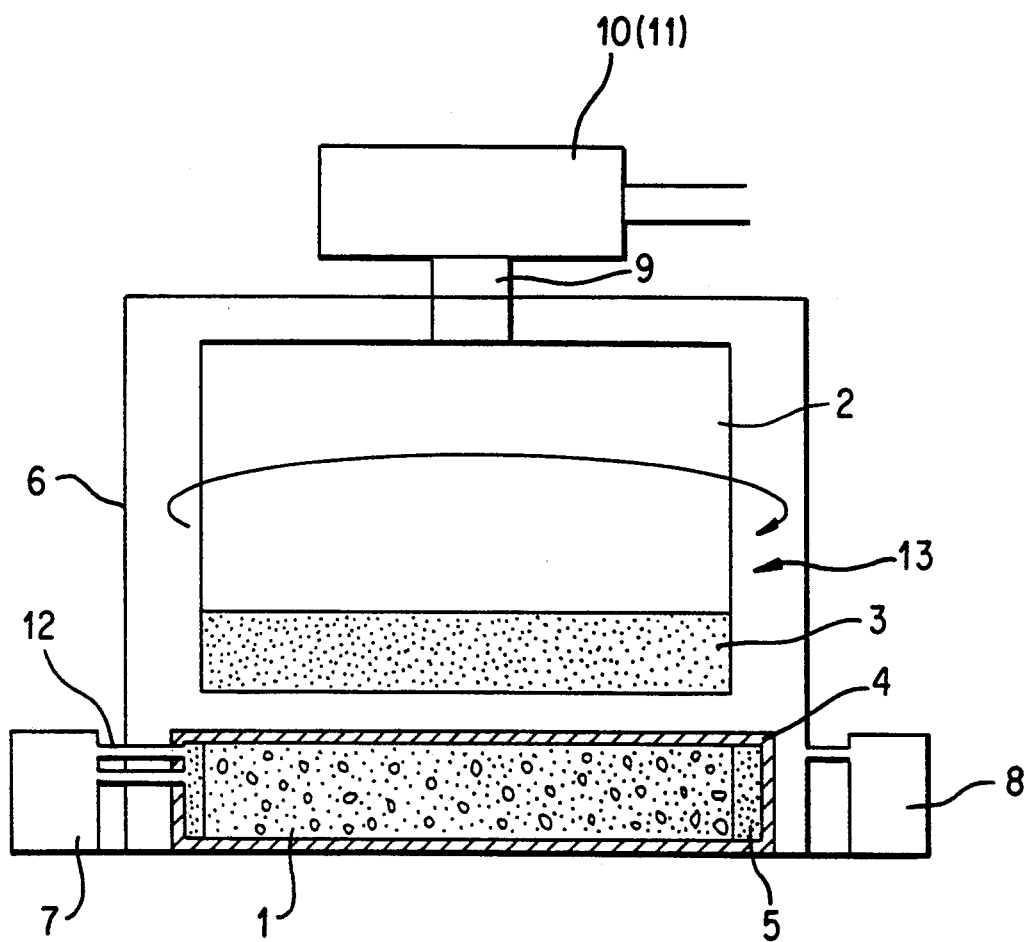
FIG. 1 is a view to show the construction of the energy storage system according to the first embodiment of the present invention.

FIG. 1 shows a first preferred embodiment of the energy storage system according to the present invention, which comprises a high temperature oxide superconductor 1, a cylindrical weight 2, a disk-like permanent magnet 3 fixed at the bottom of the weight 2, an insulated container 4, liquid nitrogen 5, a vacuum tank 6, a cooling device 7 for liquid nitrogen, a depressurizing device 8, a shaft 9, an input/output device having an electric motor 10 (input unit) and a power generator device 11 (output unit), and a liquid level regulating device 12 for liquid nitrogen.

The high temperature oxide superconductor 1 is a bulky block fixedly placed inside the insulated container 4 containing liquid nitrogen 5 and is superconductive at temperatures below the boiling point (77 K) of liquid nitrogen which is at least lower than the critical point.

The weight 2 inside the vacuum tank 6 is provided with a disk-like permanent magnet 3 at its bottom and constitutes a rotary member 13. The rotary member is placed above the insulated container 4. When the superconductor 1 becomes superconductive, the weight 2 provided with the permanent magnet 3 is lifted and becomes rotatable about the central axis (not shown) directly above the insulated container in a non-contacting manner. Gas inside the vacuum tank 6 is evacuated by the depressurizing device 8, to effectively eliminate friction of the gas which may otherwise damp the rotation of the rotary member 13.

Since the liquid nitrogen 5 may rise in temperature and become evaporated by absorbing the external heat, the liquid surface thereof is maintained at a given level at least inside the vacuum tank 4 by cooling the same with the cooling device 7 to a temperature below a given critical temperature. To this end, a liquid level regulating device 12 communicating with the insulated container 4 is provided, which automatically detects if the amount of liquid nitrogen 5 inside the insulated container 5 decreases and supplies liquid nitrogen to the container 4 via the cooling device 7, to thereby constantly maintain the superconductivity of the superconductor 1 by submerging the same in the liquid nitrogen.

The operation of the high temperature oxide superconductor 1 according to the first embodiment of the present invention will now be explained.

Figure 2:
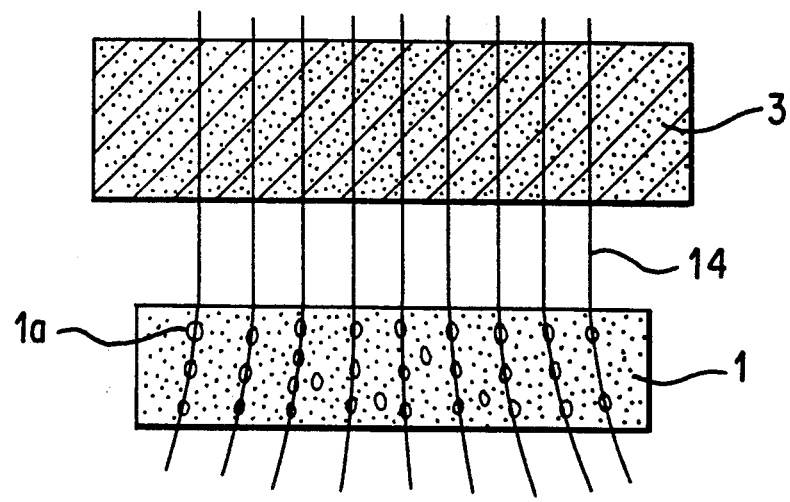
FIG. 2 is an explanatory view to show that the lines of magnetic force of the disk-like permanent magnet are pinned inside the superconductor by impurities contained in the crystal.

Referring to FIG. 2 which shows the pinning of the lines of magnetic force by the superconductor, the lines of magnetic force 14 from the magnets 3 penetrate into superconductor 1 when a permanent magnet 3 and the like is placed near the superconductor 1 and become fixed in place as if pinned down through the phase of impurities 1a present in the superconductive crystal. This is a so-called pinning effect. The lines of magnetic force 14 thus pinned act in turn to pin the permanent magnet 3 in place, whereby if the magnet 3 is about to move in a manner that may cause a change in the lines of magnetic force 14 inside the superconductor, there will be a force acting against such movement. In other words, a force of repulsion will act if the magnet approaches too near the superconductor while force of attraction will act if the magnet moves away.

When the magnetic flux is distributed concentrically, as in the case of the disk-like magnet 3 of this embodiment; the distribution of the magnetic flux penetrating the superconductor will not be distrubed even if the rotary member is rotated about the rotary shaft 9 located at the center of the magnet 3. As a result, there will be no force that may prevent the rotation of the rotary member. In other words, the permanent magnet 3 is held pinned at the center thereof and continues rotating in a non-contacting and non-resistant state of being floated in the space without lateral displacement.

According to the first embodiment, by driving the motor 10 with electric power supplied from the outside for a predetermined period of time and subsequently suspending the power supply, the shaft 9 and the weight 2 together with the disk-like permanent magnet 3 attached thereto are caused to rotate for an extensive period of time, enabling storage of energy in the form of kinetic energy of rotation. Since frictional resistance of gas would act if placed in the air, the rotary member is placed inside the vacuum tank 6 which is under highly reduced pressure by the depressurizing device 8 as mentioned above to minimize the frictional resistance. This enables highly efficient storage of electric power in the form of kinetic energy of rotation.

When it needs the electric power, the power generating device 11 which doubles as the motor 10 is actuated to convert the kinetic energy of rotation into electric power.

The stored power E can be substantially uniquely determined by the following expression:

$$E = (1.3 \times 10^{-7}) \rho D^4 h R^2 (KWH)$$

wherein
D: diameter of the rotary member (m)
h: height of the rotary member (m)
$\rho$: average specific gravity of the rotary member including the magnet (g/cm$^3$)
R: number of rotation of the rotary member (rpm).

For example, given D=5, h=4, $\rho$=5, and R=3,600, the stored electric power would amount to approximately $2.1 \times 10^4$ KWH. This is equivalent to electric power obtained by a generator of 877 KW capacity in one day. The high temperature oxide superconductor 1 of this embodiment is experimentally proven to have the force of lifting of more than 2 kg/cm$^2$ at 77 K, which is sufficient to uplift the weight 2 under these conditions. If the temperature is lowered to about 60 K by the cooling device, the pinning force would drastically increase by two to ten folds.

Figure 3:
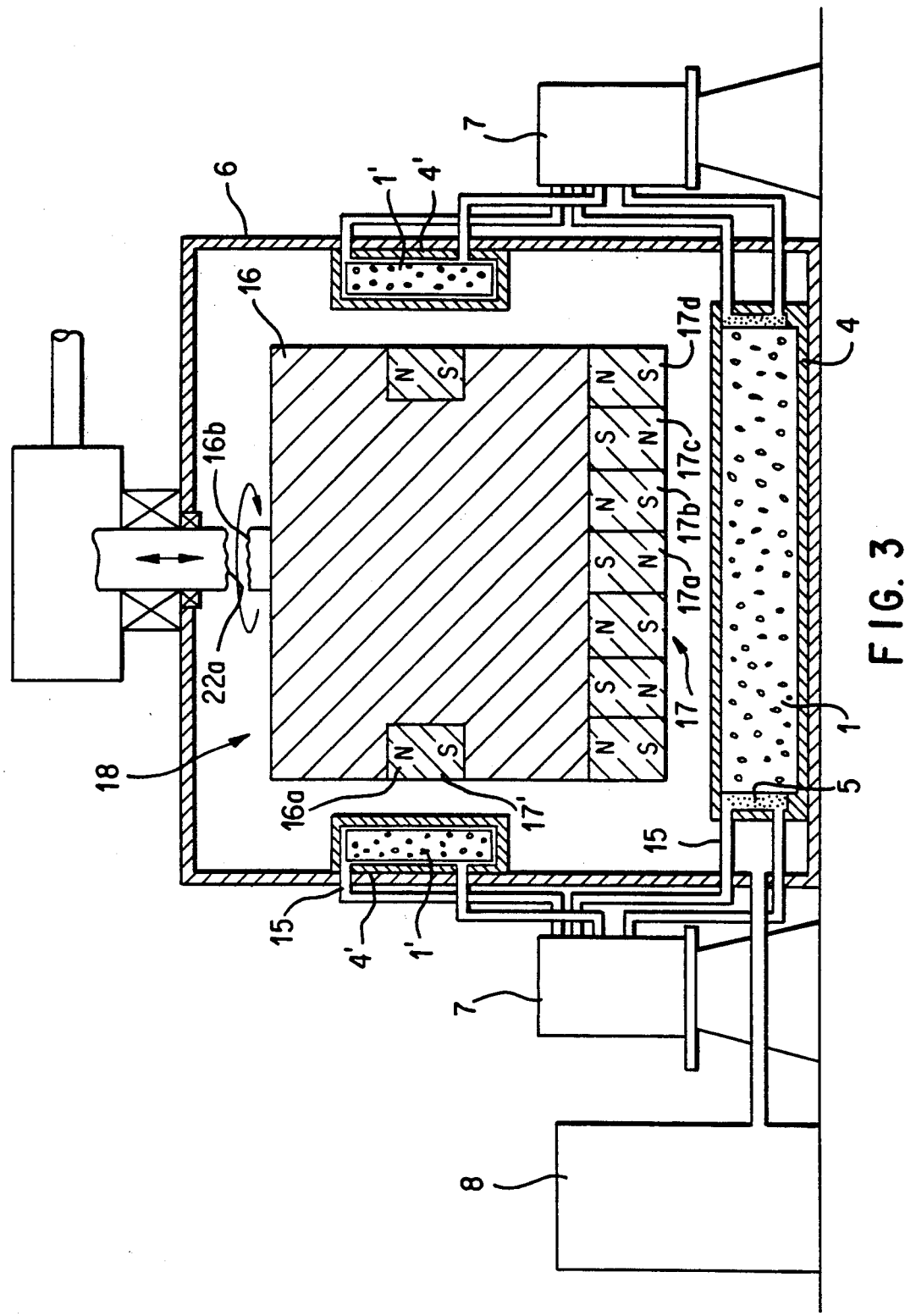
FIG. 3 is a view to show the construction of the energy storage system according to the second embodiment of the present invention.
Figure 4:
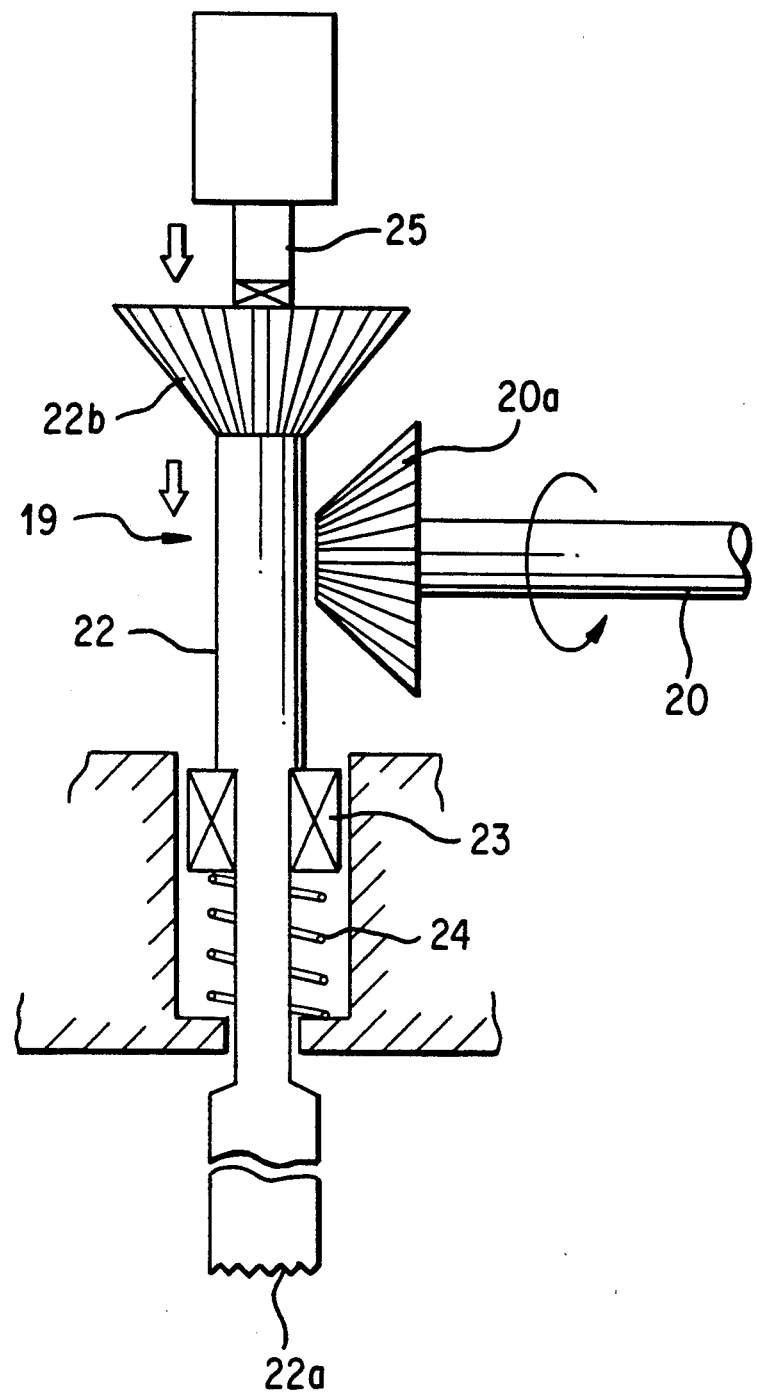
FIG. 4 is a schematic view to show the construction of the clutch mechanism in the second embodiment of the present invention.

Referring now to FIGS. 3 and 4, the second embodiment of the energy storage system according to the present invention will be described. The component parts identical to those of the first embodiment are represented by the same reference numbers to avoid duplicating explanation.

The second embodiment of the energy storage system shown in FIG. 3 comprises a vacuum tank 6, oxide superconductors 1, 1' respectively housed inside insulated containers 4, 4', a cooling device 7 for liquid nitrogen, a liquid level regulating device 15, a weight 16, annular permanent magnets 17, 17', and an input/output device (not shown).

The insulated container 4' is annular, is fixed on the entire inner periphery of the cylindrical vacuum tank 6, and is connected to the cooling device 7 via a communicating pipe. The oxide superconductor 1' to be housed in the insulated container 4' is also annular, and is held superconductive by being submerged in the liquid nitrogen inside the container 4'. It is noted that the insulated container housing the superconductor should not necessarily be provided at the bottom floor or the inner periphery of the vacuum tank, as shown, but may be provided near the top of the vacuum tank. In that case, the magnet is preferably attached on the upper side of the weight 16 opposing the top surface of the vacuum tank 6.

The liquid level regulating device 15 in this embodiment is a pressure or a temperature sensor which detects if the tank is not filled with liquid nitrogen to the depth sufficient to completely submerge the superconductors 1, 1', and supplies the same to the predetermined depth by actuating an electromagnetic valve and a pump (not shown).

The weight 16 is formed substantially cylindrical with a substance which has predetermined weight to give predetermined level of moment of inertia. A groove 16a is provided around the entire outer periphery of the weight 16 so that the annular permanent magnet 17' can be fitted therein. Another annular permanent magnet 17 (except for the center piece which is formed cylindrical) is fixed to the bottom of the weight 16. These component parts constitute the rotary member 18.

The annular or cylindrical permanent magnet 17 comprises four closely attached concentric layers of magnets 17a through 17d, each of which having magnetic poles at the top and the bottom respectively. The magnetic poles of adjacent layers are in reverse arrangement with one another.

The input/output device transmits external energy to the rotary member 18 via the clutch mechanism 19 shown in FIG. 4. Unlike the device of the first embodiment in which the electric motor (input unit) acts also as a power generator (output unit), the input unit and the output unit are two separate units.

In order to improve the rotational efficiency of the rotary member, or the conservation efficiency of the energy, the clutch mechanism 19 is actuated only when the external energy is transmitted to connect the rotary shaft 20 of the motor (generator) to the transmission shaft 22.

At the bottom face of the clutch mechanism 19 is provided an upper gear 22a which engages a lower gear 16b (FIG. 3) fixed at the center of the weight 16, so that the clutch mechanism is journaled in a vertically movable manner by bearings 23. The clutch mechanism 19 further comprises a transmission shaft 22 which is rotatably supported, a spring 24 which pushes the transmission shaft 22 upward with elastic force via the bearings 23, and a plunger 25 fixed at the upper end of the shaft 22 which pushes downward a bevel gear 22b against the elastic force of the spring 24, the bevel gear 22b being engageable with another bevel gear 20a provided on the rotary shaft 20. When the plunger 25 is actuated to cause the transmission shaft 22 to move downward for a given number of strokes, the bevel gear 20a becomes engaged with the bevel gear 22b. Concurrently, the gears 22a and 16b are engaged to transmit the rotational force of the rotary shaft 20 to the side of the weight 16; alternatively, the rotational force on the side of the weight 16 can be transferred to the side of the rotary shaft 20. It should be noted that the construction of the clutch mechanism is not restricted to that mentioned above, and various types may be used.

Figure 5:
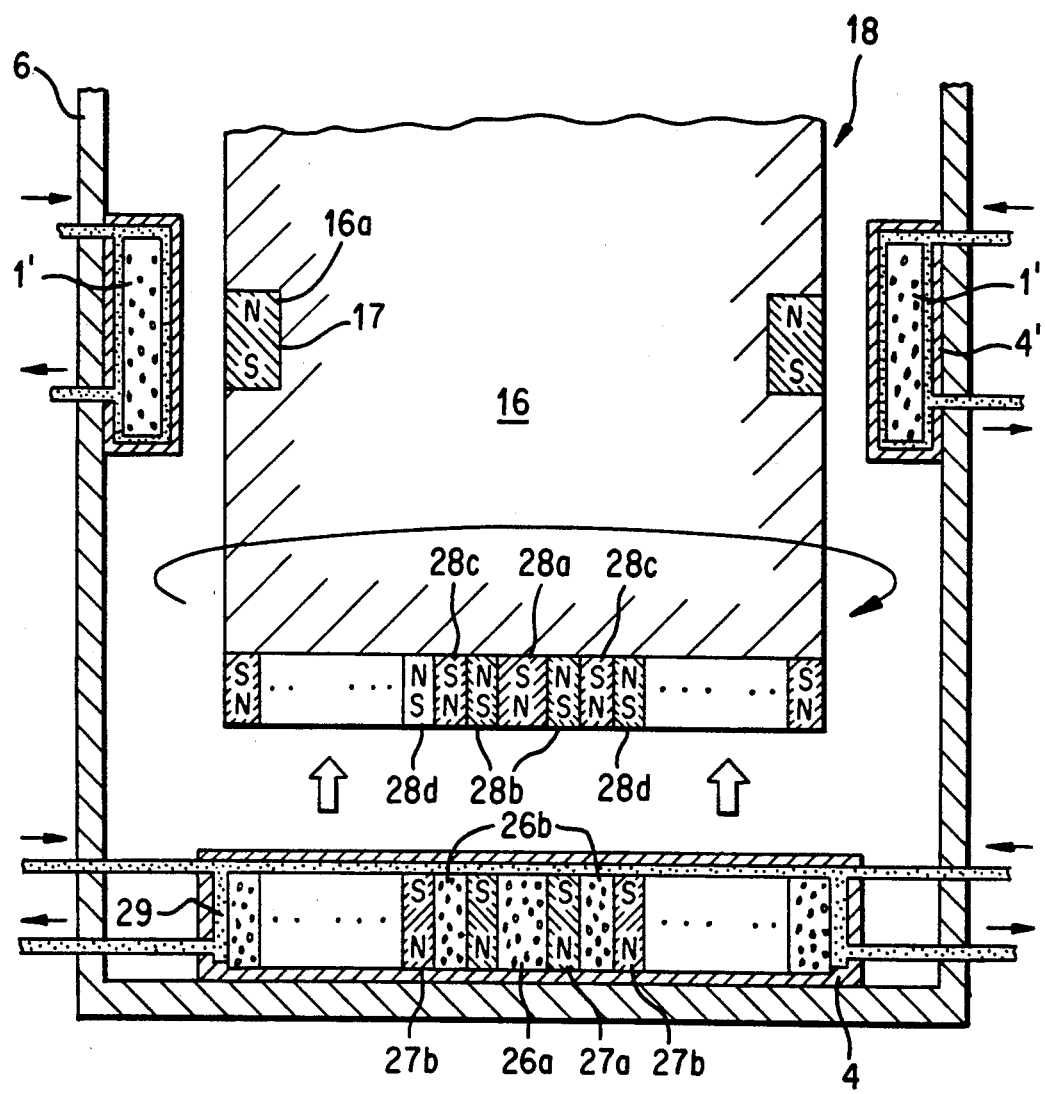
FIG. 5 is a sectional view to show the essential part of the energy storage system according to the third embodiment of the present invention.

Referring now to FIG. 5, the third embodiment of the energy storage system according to the present invention will be described. Component parts identical to those in the second embodiment are given the same reference numbers to avoid duplicating explanation.

The oxide superconductors 26a, 26b . . . in the third embodiment (FIG. 5) are concentric annular members (except for the one at the center which is cylindrical) with different diameters and are arranged in multilayers with a predetermined interval therebetween.

Electromagnets 27a, 27b . . . are disposed between the superconductors 26a, 26b . . . to increase the lifting power as well as to adjust said power depending on the mass of the rotary member 18 by adjusting the amount of current which is applied to the electromagnets 27a, 27b . . . Each of the electromagnets 27a, 27b . . . comprises a core about which a wire and the like is wound for about 1500 times to form a coil (not shown). A current is applied to the coil up to about 20 A; by doing so, the lifting power improves by about 10 fold.

Each of the electromagnets 27a, 27b . . . has the same polarity at the identical portion, for example at the upper face (in this embodiment, the polarity at the upper face is S). Both the superconductors 26a, 26b . . . and the electromagnets 27a, 27b . . . are submerged in the liquid helium 29 contained in the insulated container 4 and cooled to a predetermined temperature.

Opposing the superconductors 26a, 26b . . . and the electromagnets 27a, 27b . . . housed in the insulated container 4, a cylindrical permanent magnet 28a (only at the center) and annular permanent magnets 28b . . .

are concentrically arranged at the bottom face of the weight 16 forming the rotary member 18. The permanent magnets are sectioned in the same manner as superconductors and the electromagnets. By sectioning the magnetic pole of the permanent magnets in the radial direction, the magnetic gradient (dH/dZ) can be increased, to thereby significantly increase the pinning force (lifting force) (F) of the superconductors, as expressed by the following formula:

$$F = M \cdot dH/dZ.$$

The pinning force also acts as a force that prevents lateral displacement.

As a result, the lifting force for the rotary member 18 is significantly increased by the use of permanent magnets 28a, 28b . . . arranged in multilayers and having increased magnetic gradient as well as electromagnets 27a, 27b . . . arranged between the superconductors 26a, 26b . . . .

This enables use of very heavy rotary members, and the energy storage system as a whole can also be made very large in size and capacity.

Although the present invention has been described in detail referring to specific embodiments, it is not in any way restricted by these embodiments, and various modifications and changes are possible without departing from the scope of its gist.

As is mentioned in the foregoing, the energy storage system is capable of storing and taking out electric power and the like whenever necessary. Since the rotary member of the system is rotated in a non-contacting state without frictional resistance caused by a support or bearings, conversion loss of energy can be reduced to be minimal, realizing highly efficient storage of energy. The system with its high recovery efficiency is highly applicable to storing excess power during the night or storing energy in space stations.

Further, as the rotary member is rotated in a non-contact state and its load is supported by the entire surfaces of the magnets, an energy storage system with high capacity can be easily realized without fail by using high temperature oxide superconductors having high lifting force.

According to the invention, the magnet attached to the rotary member is sectioned to increase the magnetic gradient, so that a significant increase in the pinning force (lifting force) proportional to the magnetic gradient can be obtained.

The rotary member is held suspended in space in a non-contacting member by the pinning force (fishing effect) of the high temperature oxide superconductor. Further, annular or disk-like magnets are so arranged that the magnetic flux thereof would be distributed concentrically in the rotational direction of the rotary member. In this manner, the rotary member is supported in a freely rotatable manner in a non-contact state without friction. By imparting a rotational momentum to the rotary member by means of the input-/output device such as motor, the rotary member can rotate continually for an extended period of time, enabling storage of the energy.

The energy stored in the system can be arbitrarily recovered in the form of electric power, etc. by transmitting the energy to a power generator and the like via the input/output device.

What I claim is:

1. An energy storage system comprising an insulated container which houses at least one high temperature oxide superconductor, a cooling device which cools a coolant for maintaining said superconductor inside the container at a temperature below the critical temperature of the superconductor, a rotary member comprising permanent magnets or electromagnets having concentrically distributed lines of magnetic force and a weight attached to the magnets to increase inertia of said rotary member, a vacuum tank which houses at least said insulated container and also houses said rotary member in a freely rotatable manner and which is maintained at a very low pressure by a depressurizing device, and an input/output device which imparts a rotational force to said rotary member in the vacuum tank with external energy to cause the member to rotate, to thereby store said external energy in the form of kinetic energy of rotation as well as to take out the stored kinetic energy of rotation.

2. The energy storage system as claimed in claim 1 wherein the magnets that are concentrically arranged on the rotary member and opposing said high temperature oxide superconductor inside the insulated container are sectioned in the radial direction of the rotary member in order to increase the magnetic gradient of the magnetic field formed by said magnets.

3. The energy storage system as claimed in claim 1 wherein the high temperature oxide superconductor has a first radius, and further comprising a second superconductor housed in said container and having a second radius different than said first radius, said superconductors being arranged concentrically and disposed between the magnets which also have different radii and are arranged concentrically in multilayers.

4. The energy storage system as claimed in claim 1 wherein a liquid level regulating device is provided to constantly maintain the depth of the coolant at a given level inside the insulated container so that the high temperature oxide superconductor in the insulated container can be submerged in the coolant.

5. The energy storage system as claimed in claim 1 wherein the input/output device has an input unit which causes the rotary member to rotate with said external energy, said input unit comprising an electric motor having a clutch mechanism interposed between the unit and the rotary member.

6. The energy storage system as claimed in claim 1 wherein the input/output device has an output unit, said output unit comprising a power generator having a clutch mechanism interposed between the power generator and the rotary member.

7. The energy storage system as claimed in claim 1 wherein the coolant is liquid nitrogen.

8. The energy storage system as claimed in claim 1 wherein the coolant is liquid helium.

9. The energy storage system as claimed in claim 1 wherein said permanent magnets or electromagnets are annular.

10. The energy storage system as claimed in claim 1 wherein said permanent magnets or electromagnets are disk shaped.

11. An energy storage system comprising an insulated housing, at least one high temperature oxide superconductor in said housing, a coolant in said housing, means for cooling said coolant to maintain said superconductor at a temperature below the critical temperature thereof, a rotary member comprising magnets having concentrically distributed lines of magnetic force that penetrate the superconductor to cause the rotary element to be held at a given position, said rotary element having a weight attached to the magnets to increase inertia of said rotary member, a vacuum tank enclosing said insulated housing and said rotary member, means for maintaining a very low pressure in said housing, said rotary member being rotatable in said vacuum tank, and input/output means coupled to impart a rotational force to said rotary member with external energy to cause the member to rotate, to thereby store energy in the form of kinetic energy of rotation, said input/output means further comprising means for recovering energy from said kinetic energy.

* * * * *